United States Patent [19]

Donnarumma et al.

[11] 3,753,730

[45] Aug. 21, 1973

[54] PROCESS FOR FLAVORING RICE, COMPOSITIONS USED THEREWITH, AND PRODUCTS OBTAINED THEREBY

[76] Inventors: Carmine Donnarumma, Washington Twsp., Bergen County; Harvey Farber, Forest Hills, both of N.J.; Charles H. Grimm, Woodmere, N.Y.; Simpey Kuramoto, Ridgewood, N.J.; Don Marmo, Farmingdale; Herbert S. Stein, Rosedale, both of N.Y.

[22] Filed: Oct. 16, 1970

[21] Appl. No.: 81,623

[52] U.S. Cl. .................. 99/83, 99/140 R, 99/166
[51] Int. Cl. .................... A23l 1/10, A23l 1/26
[58] Field of Search .................. 99/83, 140, 166

[56] References Cited
UNITED STATES PATENTS

| | | | |
|---|---|---|---|
| 2,475,133 | 7/1949 | Furter et al. | 99/83 X |
| 2,508,477 | 5/1950 | Stievater et al. | 99/83 X |
| 2,712,499 | 7/1955 | Iselin | 99/11 |
| 2,836,495 | 5/1958 | Thompson et al. | 99/83 X |
| 1,943,374 | 1/1934 | Dreyfus | 99/83 |
| 2,389,770 | 11/1945 | Gaver | 99/140 R |

FOREIGN PATENTS OR APPLICATIONS
1,226,476  3/1971  Great Britain

OTHER PUBLICATIONS

"Chemicals Used In Food Processing," National Academy of Sciences–National Research Council, Publication 1274, Washington, D.C. (1965), pp. 107 & 172.

Primary Examiner—Morris O. Wolk
Assistant Examiner—Sidney Marantz
Attorney—Brooks, Haidt & Haffner

[57] ABSTRACT

Processes for altering the flavors of particulate grain products which comprise applying a composition comprising a flavoring agent, an edible, cold water-insoluble film-former, and a vehicle to a particulate grain product; drying the distributed composition to form a flavor-containing film on the grain product; and optionally distributing the coated flavored grain through a larger mass of uncoated grain particles; as well as products obtained thereby. The flavor of rice, such as "miracle rice," is altered by applying a solution containing a carbonyl flavoring material as the flavoring agent.

14 Claims, No Drawings

PROCESS FOR FLAVORING RICE, COMPOSITIONS USED THEREWITH, AND PRODUCTS OBTAINED THEREBY

BACKGROUND OF THE INVENTION

The present invention relates to processes for altering the flavors of particulate edible materials and to the products obtained according to such processes.

Many grain products have a bland or unwanted flavor due to prior processing, the particular strain of grain used, or for other reasons. Moreover, there are also local preference factors involved, and these can limit the market for a foodstuff, even though the foodstuff is equally, or even more, nutritious or is superior in other ways.

An instance of this has occurred in connection with the recently developed "miracle rice." These new rice strains are superior in yield and speed of growth, but to some people the flavor is not as acceptable as the flavor of older, traditional forms of rice. Moreover, in countries such as Indonesia a more highly flavored rice, variously known as "radjalele," "tjiandjur," "festive rice" or simply "number one rice," is prized. Its relatively high cost limits its use to ceremonial or gala occasions, and "miracle rice" is considered to be far inferior to radjalele.

Attempts have been made to add flavoring materials to rice. These attempts have involved adding flavor directly to the rice by a number of methods, but a successful product has not been obtained. Many peoples wash the rice prior to cooking, and the washing is continued until the wash water runs clear so that all starch and surface materials are removed. The rice is thereafter steamed and/or cooked. It has been found in the past that such washing and cooking remove any flavoring agents which have been added to the rice.

Rice has been enriched by entrapping vitamins and minerals in a coating and then whitening the resulting off-colored product, as shown for example in U.S. Pat. No. 2,712,499, but no satisfactory method of flavoring rice or kindred products has been known in which flavoring is adhered or otherwise adsorbed on or bonded to the grain so that flavor release will occur during steaming, boiling, or otherwise cooking the grain so that the aroma is sensed during cooking and so that the flavor is sensed during ingestion of the grain.

THE INVENTION

Briefly, the present invention contemplates the production of flavored particulate grain products by a process which comprises preparing a mixture of a flavoring agent, an edible, water-insoluble, film-former, and a solvent; applying the mixture to the surfaces of a particulate grain product; and drying the mixture to provide a flavor-containing film on the surface of the product. Minor quantities of the foregoing flavored grain product can then be thoroughly admixed with major quantities of unflavored particulate grain products to provide a finished product suitable for cooking and serving in the conventional matter. The present disclosure further contemplates the pre-mix compositions and/or particulate grain products so produced, as well as coating compositions.

As used herein, particulate grain products is taken to include the grain particles themselves such as rice, corn, buckwheat, barley and the like, as well as particulate products obtained from grains, such as hominy grits, farina, and the like. It will be understood that the grain products can also include broken or fragmented grains or grain-based discrete particulate products such as noodles like "Raman" noodles. Certain preferred aspects of the invention are particularly concerned with rice. The rice treated according to the processes disclosed herein includes conventional long - and short-grain rices, as well as the new "miracle rice." It will be understood by those skilled in the art that a number of different miracle rices, such as IR-5, IR-20 and so on are available, and all can be treated according to the present invention.

The film-formers utilized in the described processes are edible and cold water-insoluble. It is also desirable that they be tasteless. As used herein, insolubility in cold (less than 100°F) water means that the film-former can withstand substantial periods of immersion and abrasion during washing. Moreover, the film-former should permit hot water or steam penetration and the gelatinization of starch during cooking.

As noted, the film-former should also be edible, that is, capable of being ingested in ordinary amounts without causing gastrointestinal or other distrubances in the metabolism. Desirably, the film-forming materials used are those formally approved by governmental or other public health officials, and it is preferred that they be generally recognized as safe.

A film-former is a material capable of forming an adherent film on the particulate material. The film so formed is preferably relatively thin, and while the film should cover a substantial portion of the surface of the particle, it need not be a completely continous integument, nor need it be free from minor imperfections such as pinholes and the like.

The film-former should also be capable of being dissolved or at least highly dispersed in a vehicle, preferably one which is a solvent. The vehicle or solvent is desirably non-toxic and approved for food use, and the film-former must accordingly be soluble or highly dispersible in the liquid, such liquids being referred to hereinafter simply as solvents. Examples of solvents are ethanol and propylene glycol, and ethanol is especially preferred since it appears to have a protective effect on the flavoring composition in many embodiments of the invention.

The coating of film-former and flavoring composition formed on or around the particulate grain product should be capable of liberating the flavor so that it can be sensed when the grain product is ingested. The liberation of the flavor can be achieved by controlling the solubility or the frangibility of the film-former to permit disintegration or rupture of at least part of the coating upon cooking and/or eating. Thus, for example a resin which is cold water insoluble but hot-water soluble would permit the flavor to be retained on the rice during repeated washings; however, it would liberate the aroma and/or flavor on cooking. A frangible film-former is one which would be ruptured or broken to release the flavor, for example, upon swelling of the grain product during cooking. Thus, the film-former should be "flavor-liberable" as by being disintegratable, frangible, or hot water-soluble.

Accordingly, preferred film-formers include pharmaceutical glaze (shellac), prolamines, and ethyl cellulose. The prolamines are fractions of certain naturally occurring proteins. Thus, zein from corn, gliadin from wheat, and similar prolamines can be used. When shellac is used it should be of pharmaceutical or food grade quality.

Flavoring composition as used herein means one which alters the flavor of the foodstuff by supplementing or fortifying a natural or artificial flavor in the foodstuff or one which supplies substantially all the flavor and/or aroma character to the foodstuff. The term "alter" in its various forms will accordingly be understood to mean the supplying or imparting of a flavor character or note to an otherwise bland or tasteless grain product, or augmenting an existing flavor characteristic where the natural flavor is deficient in some regard, or supplementing the existing flavor impression to modify the organoleptic character of the grain product.

Flavoring compositions for use herein can include flavor materials, vehicles, stabilizers, thickeners, surface active agents, conditions, and flavor intensifiers.

Flavoring materials include saturated and unsaturated alcohols, including primary and secondary alcohols; esters; carbonyl compounds including ketones and aldehydes; lactones; other cyclic organic materials including benzene derivatives, alicyclics, heterocyclics such as furans, pyridines, pyrazines and the like; sulfur-containing materials including thiols, sulfides, disulfides and the like; proteins; amino acids; lipids; carbohydrates; so-called flavor potentiators such as monosodium glutamate, guanylates, and inosinates; natural flavoring materials such as cocoa, vanilla, and caramel; essential oils and extracts such as anise oil, clove oil, and the like; artificial flavoring materials such as vanillin, and the like.

Stabilizers include preservatives such as sodium chloride, and the like, antioxidants such as calcium and sodium ascorbate, ascorbic acid, butylated hydroxyanisole, butylated hydroxytoluene, propyl gallate and the like, sequestrants such as citric acid, EDTA, phosphates, and the like.

Thickeners include carriers, binders, protective colloids, suspending agents, emulsifiers and the like, such as agar-agar, carrageenan, cellulose and cellulose derivatives such as carboxymethyl cellulose and methyl cellulose, natural and synthetic gum such as gum arabic, gum tragacanth, and the like, and other proteinaceous materials, lipids, carbohydrates, starches, and pectins.

Surface active agents include materials such as mono and/or diglycerides of fatty acids such as capric acid, caprylic acid, palmitic acid, myristic acid, stearic acid, oleic acid, and the like, lecithin, defoaming and flavor-dispersing agents such as sorbitan monostearate, potassium stearate, hydrogenated tallow alcohol, and the like.

Conditioners include compounds such as buffers and neutralizing agents such as sodium acetate, ammonium bicarbonate, ammonium phosphate, citric acid, lactic acid, vinegar and the like; colorants such as carminic acid, cochineal, tumeric, curcumin and the like; enzymes, and the like. Vehicles, in the flavor composition, can be edible or otherwise suitable materials such as ethyl alcohol, propylene glycol, water and the like.

It has been found that many grain products are particularly amenable to the addition of carbonyl flavoring materials such as diacetyl, acetylpropionyl, dipropionyl, and the like. Accordingly, in certain preferred embodiments such carbonyl compounds are present in the flavor composition or in the solution with the film-former and solvent, desirably in amounts of 0.01 to 1.5 percent of the solution.

The flavoring compositions used in connection with the present invention generally contain from about 80 to 95 percent vehicle. The amount of flavoring agent added to the grain product can vary over a wide range, and the amount used depends upon a number of factors including the flavoring level or intensity desired, the particular flavoring materials and adjuvants used, the grain product employed, local preference factors, whether or not the flavor is to be added as a pre-mix or to all of the particulate grain product, and the like.

In flavoring rice for use as a pre-mix, it has been found that at least about two ounces of flavoring composition (based upon a composition containing from 85 – 95 percent of a vehicle or carrier) for each ton of particulate grain product is used to obtain suitable flavoring, and amounts on the order of 4 ounces of such flavoring per ton are preferred. Generally amounts in excess of ten ounces per ton of such composition are not used. All parts, proportions, percentages and ratios herein are by weight unless otherwise indicated.

When a pre-mix is not used and the entire quantity of particulate grain product is coated, larger volumes of flavoring composition are utilized. Thus, in one aspect of the present invention, from 1 to 2,000 ounces of a composition containing from 99 to 99.75 percent of vehicle or carrier would be used for each ton of rice.

THe coating composition for spraying onto the entire mass of particulate grain product desirably contains from 0.2 to 1.0 percent of the flavoring composition. Coating composition for application to particulate grain product when the product is used as a pre-mix desirably contains from 5 to 20 percent of the flavoring composition and from about one to about thirty percent of film-former.

The coating composition can be applied to the particulate grain product by a variety of conventional techniques. The composition can be sprayed onto the particles by air, hydraulic, or electrostatic gun methods, in a tower or by means of fluidized bed techniques.

One of the easier methods for smaller scale production is to tumble the particles in a rotating cylinder or drum such as a coating pan or coating machine and to spray the required quantity of the composition on to granules as they are kept in motion to expose the surfaces of all the particles.

Anti-agglomeration appliances are desirably utilized if the tumbled particulate solids tend to adhere to one another through the action of the resin in the coating composition. Thus, when the particles are coated while they are tumbled in a coating pan, a counter-rotating bar and/or inert spheres such as porcelain balls can be used. When spheres are used in a coating pan to prevent agglomeration and sticking, the thickness of the coat can readily be judged by reference to the coating obtained on the spheres.

After the coating composition has been applied to the surfaces of the particles, the coating is then dried. Pre-mix is used herein to mean coated particles which can, in turn, be admixed with and thoroughly interspersed through a larger mass of particulate grain product. The pre-mix can comprise a single grain product or a plurality of grain products, and the pre-mix can be interspersed through grain products which are the same or different. It is preferred in certain embodiments that the pre-mix and the final product comprise the same grain products. Thus, a rice pre-mix would be used for flavoring a rice product.

The pre-mix is interspersed in minor quantity through a major quantity of unflavored grain products. In certain embodiments, it has been found that the pre-mix should comprise from about 1 to about 10 percent of the total finished product, and preferably the pre-mix comprises from 2 to 4 percent of the total product.

It is important that the pre-mix be substantially uniformly interspersed throughout the final product. Conventional equipment can be used to carry out this process step. The method used should not injure the coating on the grain, and any tendency greatly to increase the fines is usually suppressed. Thus, baffled and unbaffled drum mixers, baffled and unbaffled double-cone mixers and twin-shell mixers can be used, as can continuous flow systems which meter appropriate quantities of the pre-mix into the larger mass.

The pre-mix product so produced comprises discrete particulate grain products having a coating or film of the flavored final product is a mass of discrete grain product particles having dispersed therethrough a quantity of the pre-mix as set forth herein.

While it will be appreciated by those skilled in the art that the entire mass can be treated with coating composition as herein described, in certain preferred aspects of the present invention the use of a pre-mix simplifies the application of coating to the particulate grain product by reducing the quantity of solvent required, reducing the amount of particulate grain product which must be dried, and so on.

The following examples are given to illustrate embodiments of the invention as it is presently preferred to practice it. It will be understood that these examples are illustrative, and the invention is not to be considered as restricted thereto except as indicated in the appended claims.

EXAMPLE I

An Indonesian rice flavor is prepared by admixing the following ingredients:

| Ingredient: | Amount (parts) |
|---|---|
| Vanillin | 0.5 |
| Valeric acid | 0.5 |
| gamma-Undecalactone | 0.5 |
| Acetylpropionyl | 1.0 |
| Oil celery speed | 1.0 |
| Benzodihydropyrone | 1.5 |
| Maltol | 1.5 |
| Butyric acid | 2.5 |
| Diacetyl | 4.0 |
| Alcohol 95% | 87.0 |
| | 100.0 |

The flavoring composition so prepared is then admixed with a 28 percent solids pharmaceutical glaze in the ratio of 15 parts of the composition to 85 parts of glaze.

Two hundred grams of IR-20 rice is introduced into a coating pan, and four 1-inch diameter porcelain spheres are added to obviate sticking and agglomeration of the rice. The rice is then tumbled in the pan and 20 g of the flavoring composition-glaze mixture so prepared is sprayed in the form of a fine mist onto the rice. A stream of hot air is directed onto the rice in the coating pan to facilitate drying.

This coated rice is then utilized as a pre-mix for blending with a much larger quantity of rice to be flavored. In this instance, 2 kg. of IR-20 rice is admixed with 60 g of the pre-mix in a solids blender. The finished rice product is then ready for cooking and consumption.

One-half a kilogram of the finished rice product so prepared is washed with cold water and flushed until the water runs clear. After the rice is washed, it is placed into a rice cooker comprising an inner imperforate bowl and a slightly larger outer bowl fitted with a cover. The rice is placed into the inner bowl, and at this time it is noted that the rice has an odor like that of radjalele. A small quantity of water is placed in the outer bowl, the inner bowl is put into it, and the cover is placed on the outer bowl. The cooker is heated for 15 minutes to steam the rice, and the steamed rice is then held in the cooker for an additional 15 minutes.

After the cooking, the rice is eaten and is found to have an excellent flavor and aroma. The panelists all state that the rice is comparable to "number one," "festive," or radjalele rice, and some feel it is actually a superior product. The rice texture and consistency are in no way impaired by the process set forth in this Example. Similarly prepared IR-20 rice without the pre-mix of the foregoing Example is judged to be bland and relatively tasteless.

EXAMPLE II

A solution is prepared by admixing 2.5 g of Hercules Type N-22 ethyl cellulose with 97.5 g of 95 percent ethanol, and 15 g of the rice flavor of Example I is added to 85 g of the solution.

Twenty grams of the flavored solution is then sprayed onto 200 g of IR-5 rice while the rice is tumbled in a coating pan containing four porcelain spheres to prevent agglomeration and sticking of the rice grains. After the solution has been sprayed on the rice, drying is accelerated by passing a stream of heated air over the sprayed rice.

The drying time required for the rice coated with ethyl cellulose-containing mixture is much shorter than for the pharmaceutical glaze of Example I, and there is less of a tendency for the rice granules to stick or agglomerate.

The dried rice (20 g) is then thoroughly mixed with 2 kg. of IR-5 rice in a dry blender. When the rice is cooked, according to the procedure of Example I, it is found to have an excellent flavor which is comparable to radjalele.

EXAMPLE III

The procedure of Example II is repeated, and the resulting pre-mix in the amount of 80 g is added to 2 kg. of IR-5 rice. When the rice is washed and cooked as set forth in Example I, it is found to have an excellent, very intense flavor comparable to radjalele.

EXAMPLE IV

An imitation sweet corn flavor is prepared by admixing the following ingredients:

| Ingredient: | Amount (parts) |
|---|---|
| cis-3-Hexenol | 0.1 |
| Heliotropine | 0.5 |
| gamma-Nonalactone | 0.5 |
| gamma-Octalactone | 1.5 |
| Vanillin | 1.9 |
| Butyl butyryl lactate | 2.0 |
| Diacetyl | 3.0 |
| Alcohol 95% | 90.5 |
| | 100.0 |

Twelve grams of the foregoing mixture is admixed with 88 g of a solution of 2.5 g of ethyl cellulose in 97.5 g of ethanol.

Hominy grits in the amount of 200 g are placed into the coating pan as in Example II, 20 g of the flavoring composition-ethyl cellulose is sprayed on, and the sprayed grits are dried as in Example II to provide a pre-mix.

The pre-mix prepared above is added to 10 kg of grits and thoroughly blended in a Patterson-Kelley dry mixer. A 250 g portion of the grits is then prepared and cooked conventionally. The cooked grits are judged to have an excellent corn flavor.

EXAMPLE V

A barbecue spice flavor is prepared by admixing the following ingredients:

| Ingredient: | Amount (parts) |
| --- | --- |
| Oil garlic | 0.1 |
| Oil coriander | 0.2 |
| Oil mustard seed | 0.2 |
| Oil carrot seed | 0.3 |
| Oil sage Dalmatian | 0.3 |
| Oil parsley seed | 0.5 |
| Oil black pepper | 0.5 |
| Oleoresin capsicum | 1.5 |
| Oil celery seed | 2.5 |
| Alcohol 95% | 93.9 |
| | 100.0 |

The foregoing flavor composition is mixed with an ethanolic solution of pharmaceutical glaze, sprayed onto rice, and dried to form a pre-mix as in Example I.

The pre-mix is then thoroughly blended with untreated rice as in Example I. When the rice is washed and cooked as in Example I, the rice has a pleasant barbecue taste. A meat flavor can also be added further to vary the flavor and to provide a very satisfying product.

What is claimed is:

1. A process for altering the flavor of rice which comprises applying a solution of a flavoring composition containing a carbonyl flavoring material selected from the group consisting of diacetyl, acetylpropionyl, dipropionyl, an alkyl lactone containing from eight to 11 carbon atoms, and mixtures thereof, an edible, cold water-insoluble film-former, and a solvent for the film-former to the surface of the rice, and drying the distributed solution to provide a flavor-containing film on the surface of the rice, which film can withstand cold water-washing and can release the flavoring composition on cooking.

2. A process according to claim 1 wherein the film-former is shellac, a prolamine, or ethyl cellulose.

3. A process according to claim 1 wherein the film-former is shellac.

4. A process according to claim 1 wherein the film-former is ethyl cellulose.

5. A process according to claim 1 wherein the solution contains from one to twenty percent of flavoring composition.

6. A process according to claim 1 wherein the solution contains from 1 to 30 percent of film-former.

7. A process according to claim 1 wherein the solution contains from 70 to 99 percent solvent.

8. A process according to claim 1 wherein the carbonyl compound is diacetyl.

9. A process according to claim 1 wherein the carbonyl compound is acetylpropionyl.

10. A process according to claim 1 wherein the flavored rice is then uniformly distributed through a larger mass of unflavored rice.

11. A process according to claim 10 wherein the flavored rice product is washed with water and thereafter cooked.

12. A rice product, the discrete particles of which have a coating of a mixture of a flavoring composition containing a carbonyl flavoring material selected from the group consisting of diacetyl, acetylpropionyl, dipropionyl, an alkyl lactone containing from eight to 11 carbon atoms, and mixtures thereof, and an edible, cold water-insoluble film-forming resin.

13. A flavored rice product comprising the coated particles of claim 12 and a major proportion of uncoated rice.

14. A composition for coating rice which composition comprises a carbonyl flavoring material selected from the group consisting of diacetyl, acetylpropionyl, dipropionyl, an alkyl lactone containing from eight to 11 carbon atoms, and mixtures thereof, an edible, cold water-insoluble film-former; and a solvent for the film-former.

* * * * *

UNITED STATES PATENT OFFICE
CERTIFICATE OF CORRECTION

Patent No. 3,753,730  Dated August 21, 1973

Inventor(s) CARMINE DONNARUMMA, ET. AL.

It is certified that error appears in the above-identified patent and that said Letters Patent are hereby corrected as shown below:

On the cover sheet, insert -- [73] Assignee: International Flavors & Fragrances, Inc., New York, New York --.

Column 5, Example 1, line 47, "oil celery speed" should read -- oil celery seed -- .

Signed and sealed this 22nd day of January 1974.

(SEAL)
Attest:

EDWARD M. FLETCHER, JR.        RENE D. TEGTMEYER
Attesting Officer              Acting Commissioner of Patents